March 23, 1954  C. H. NORDELL  2,672,985
TRANSFER AND COMMINUTING DEVICE FOR SCREENS
Filed Aug. 14, 1950

INVENTOR.
Carl H. Nordell
BY
Schneider & Dressler
Attys.

March 23, 1954  C. H. NORDELL  2,672,985
TRANSFER AND COMMINUTING DEVICE FOR SCREENS
Filed Aug. 14, 1950  9 Sheets-Sheet 2

INVENTOR.
Carl H. Nordell,
BY Schneider & Dressler,
Attys.

March 23, 1954 C. H. NORDELL 2,672,985
TRANSFER AND COMMINUTING DEVICE FOR SCREENS
Filed Aug. 14, 1950 9 Sheets-Sheet 3

INVENTOR.
Carl H. Nordell,
BY
Schneider & Dressler,
Attys.

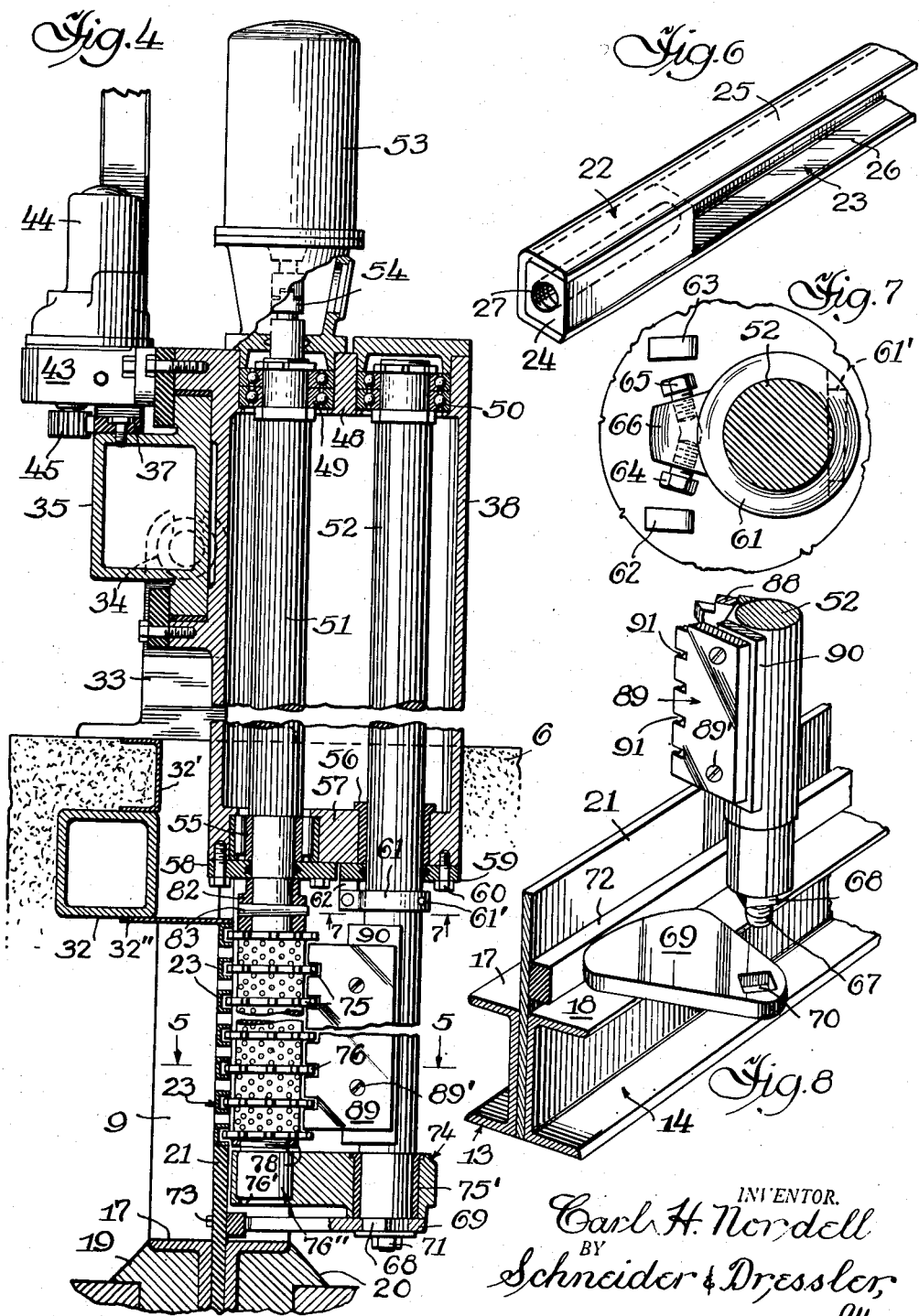

March 23, 1954  C. H. NORDELL  2,672,985
TRANSFER AND COMMINUTING DEVICE FOR SCREENS
Filed Aug. 14, 1950  9 Sheets-Sheet 5
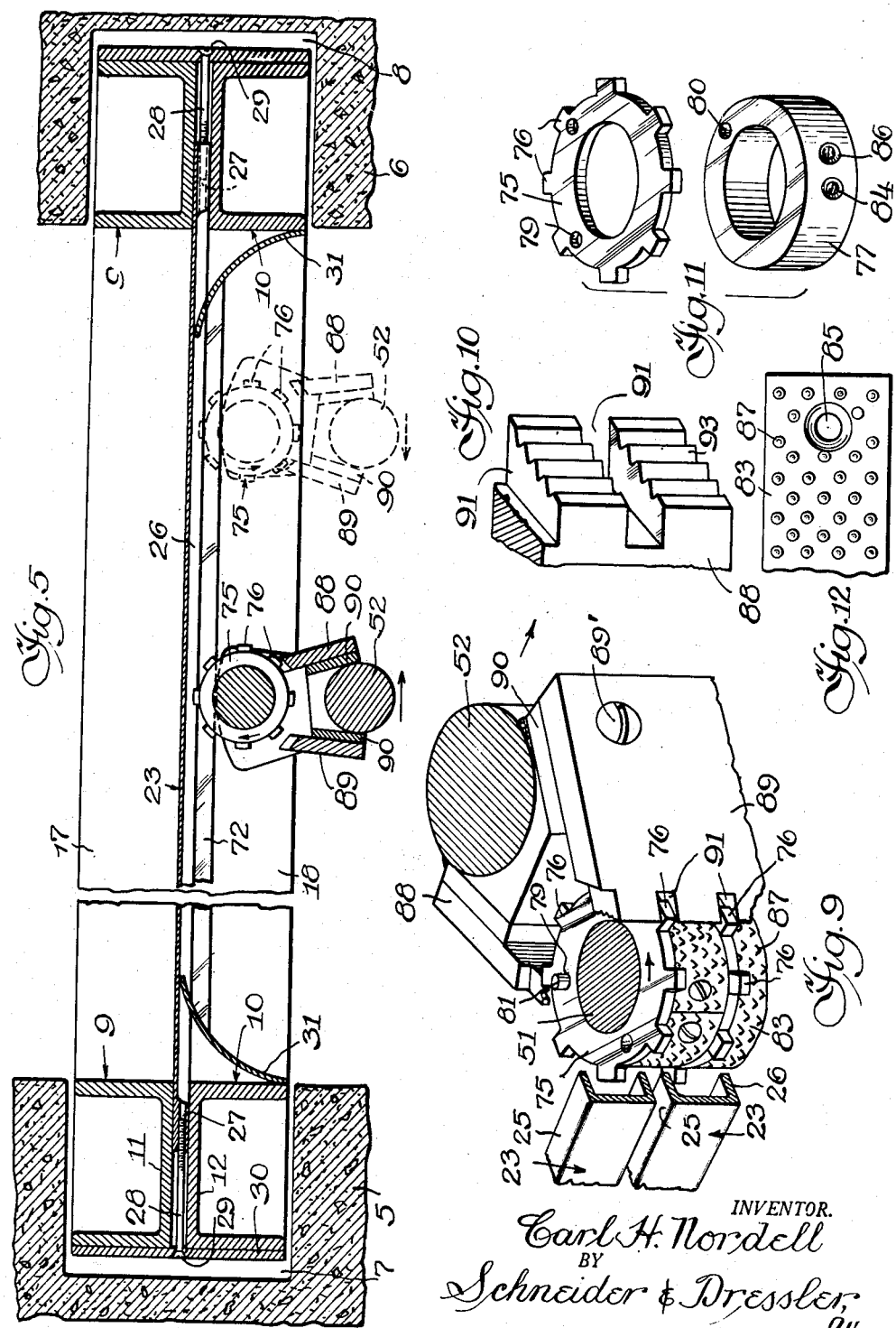
INVENTOR.
Carl H. Nordell
BY
Schneider & Dressler,
Attys

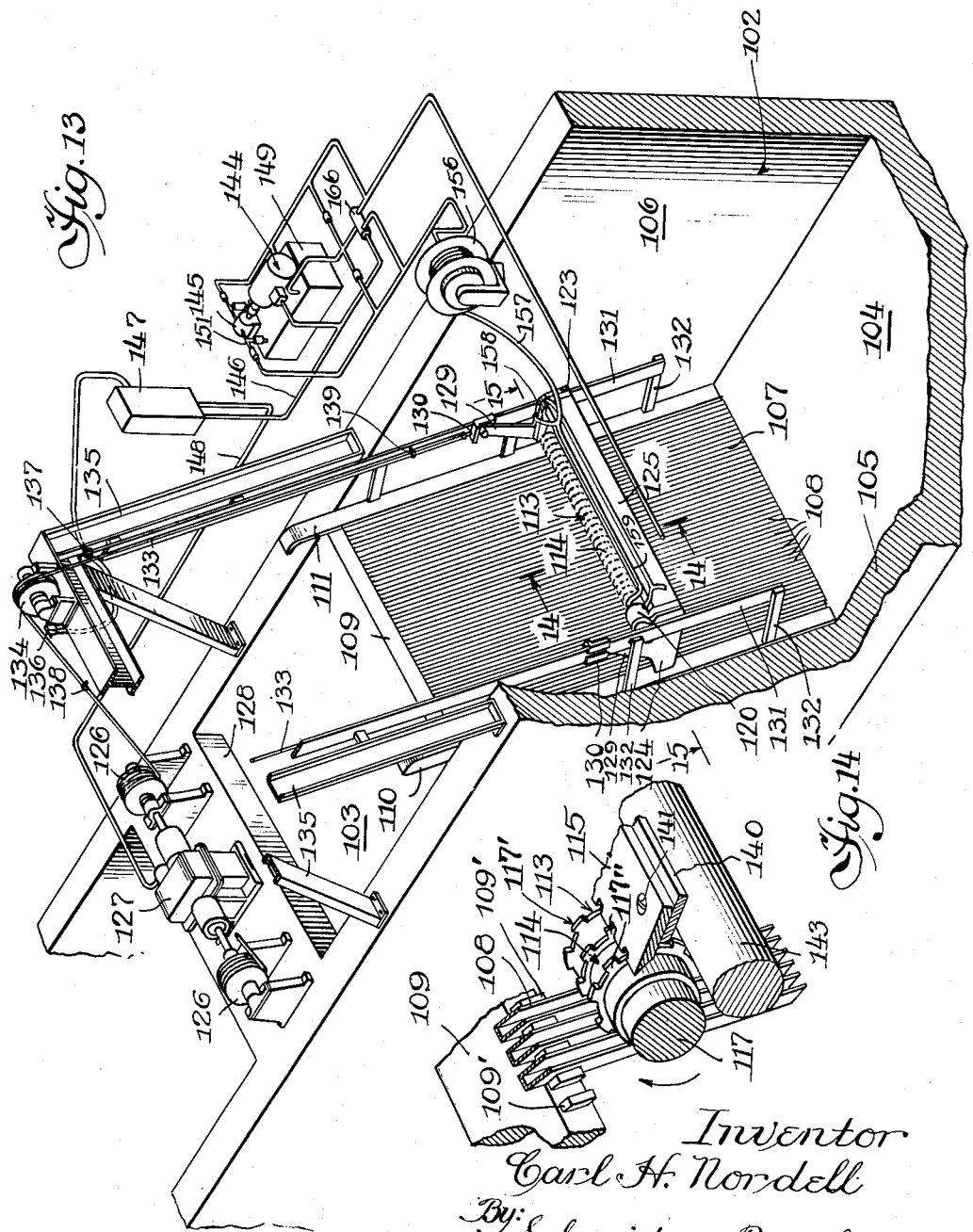

March 23, 1954 C. H. NORDELL 2,672,985
TRANSFER AND COMMINUTING DEVICE FOR SCREENS
Filed Aug. 14, 1950 9 Sheets-Sheet 7

Inventor,
Carl H. Nordell
By: Schneider & Dressler, Attys

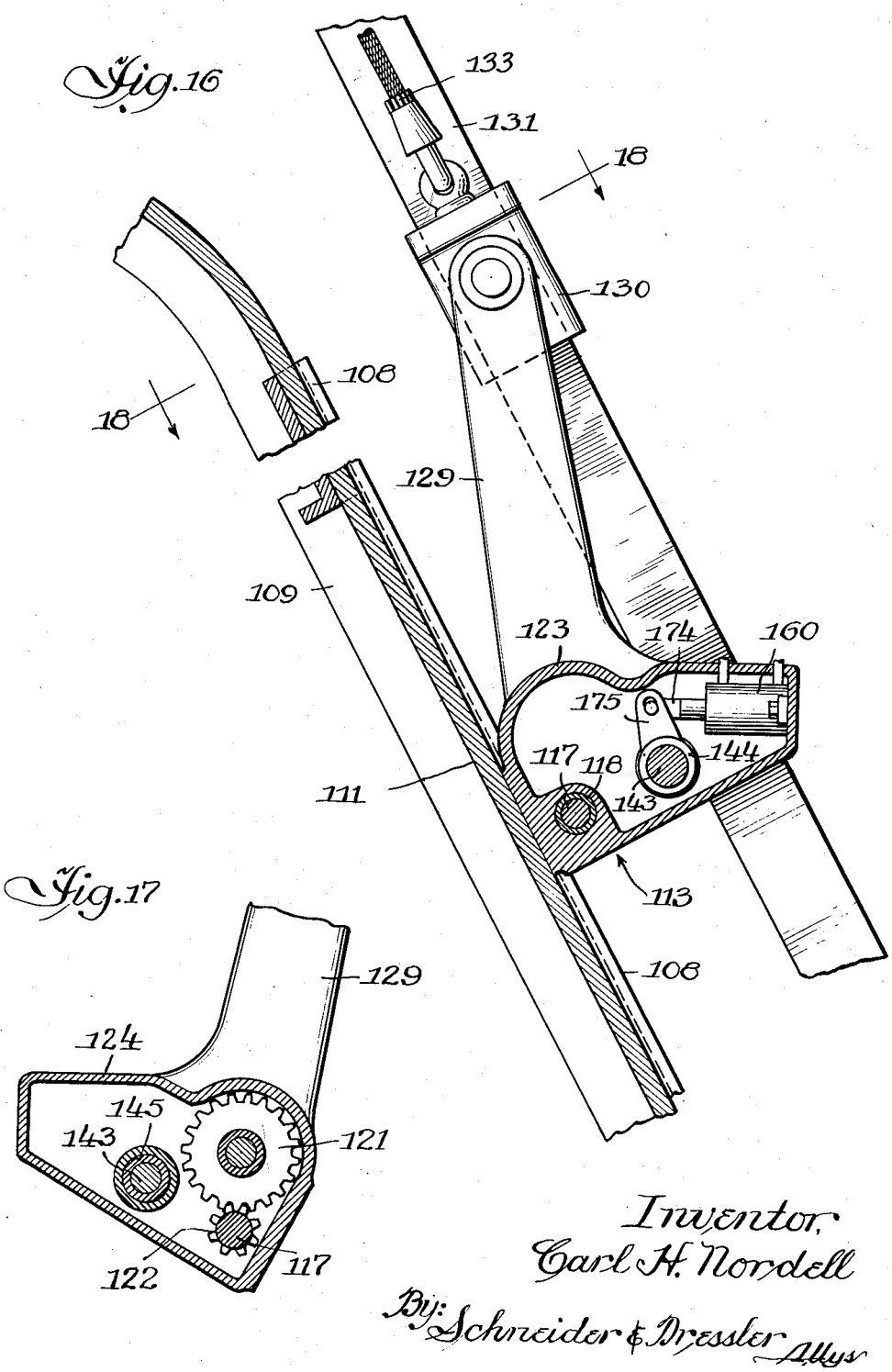

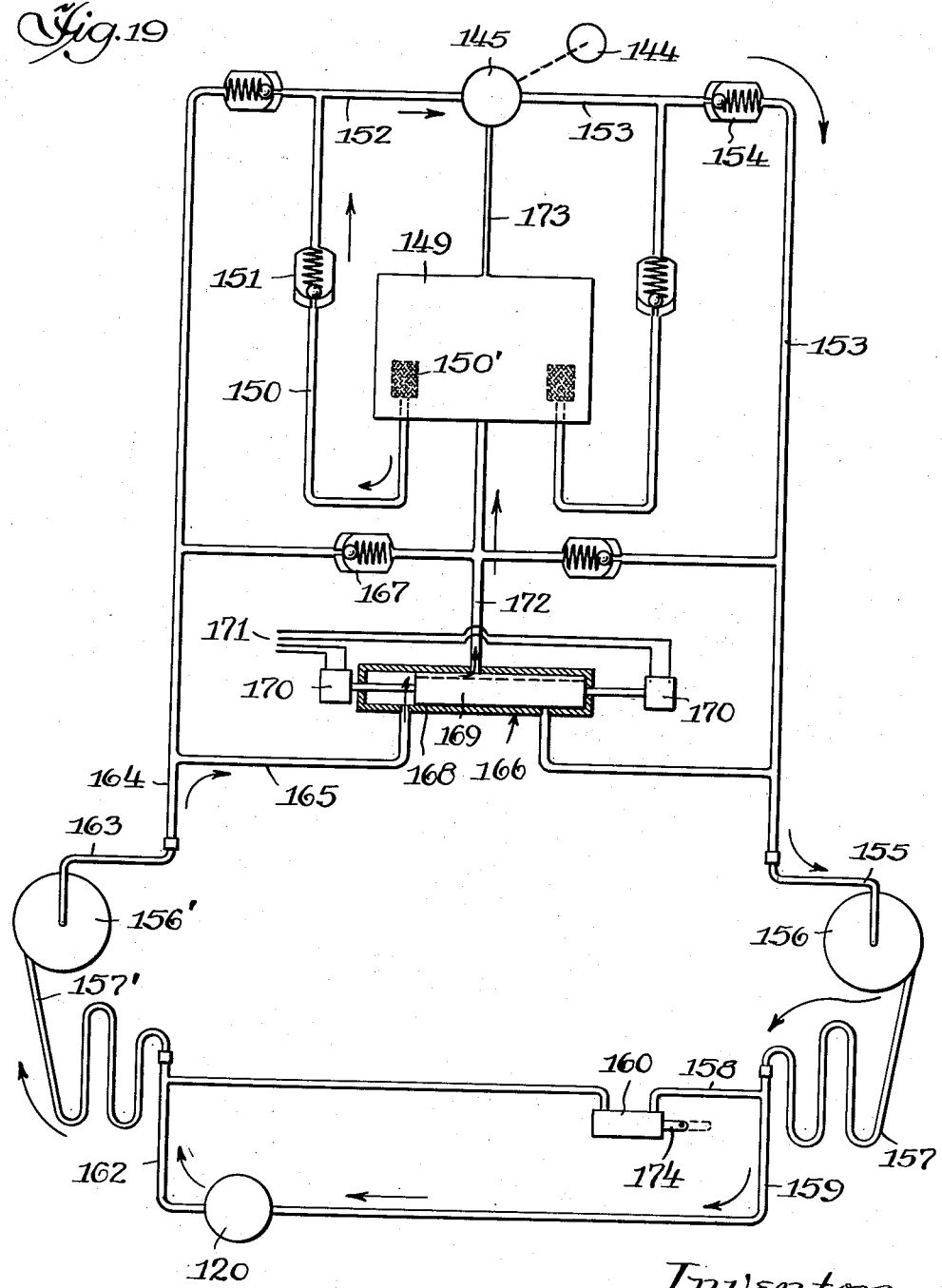

Patented Mar. 23, 1954

2,672,985

UNITED STATES PATENT OFFICE 2,672,985

TRANSFER AND COMMINUTING DEVICE FOR SCREENS

Carl H. Nordell, Palm Springs, Calif., assignor of fifteen per cent to Louise N. Millspaugh, Long Beach, and fifteen per cent to Anne N. Kaspar, Stafford Inn, Scotia, Calif.

Application August 14, 1950, Serial No. 179,140

49 Claims. (Cl. 210—152)

This invention relates to an apparatus for comminuting solids in a liquid stream, particularly in a stream of sewage flowing into a sewage treatment plant.

This application is a continuation-in-part of my co-pending application filed September 24, 1948, under Serial No. 50,925, now abandoned.

In accordance with the present invention, a transverse screen extending across the influent channel intercepts all solids too large to pass therethrough. The heavier solids carried by the stream, such as gravel or rocks, will drop to the bottom of the channel in advance of the screen, but the rest of the solids will normally accumulate against the screen and be held thereagainst by the inflowing sewage.

Further in accordance with the present invention, a combined transfer and comminuting unit mounted adjacent the frame supporting the screen is reciprocated in front of the screen to remove the solids from the face of the screen and transfer them to the comminuting elements to reduce them to such size that they will pass through the screen. The transfer and comminuting unit includes a rotating shaft provided with projecting teeth which are adapted to engage solids held against the screen to remove them from the face of the screen, and another shaft adapted to alternately position one or the other of a pair of combs in the path of rotation of said teeth, depending upon the direction of travel of the transfer and comminuting unit, to cooperate with said teeth to comminute the solids removed from the screen to a size small enough so that they can be carried through the screen by the flow of liquid sewage.

The comminuting action referred to above takes place in an area or zone removed from the screen, upstream of the screen, so that the screen is not subjected to the excessive wear incidental to the common practice of comminuting solids directly on the face of the screen. The comminution of solids away from the screen makes possible the use of a screen of relatively light construction. This, in turn, makes it possible for the screen to be fabricated from the more expensive non-ferrous metals or stainless steel, thereby improving its lasting qualities.

The screen may be arranged across the influent channel with its screen bars extending either horizontally or vertically. With the horizontal arrangement of screen bars, the combined transfer and comminuting unit is disposed vertically and with the vertical arrangement of screen bars the combined transfer and comminuting unit is disposed horizontally. The vertical arrangement does not require that the screen be perpendicular to the bottom of the channel. It may be sloped downwardly at any suitable angle. The screen having horizontal screen bars is satisfactory for use in substantially all installations, but the screen having vertical screen bars is preferred for installations having deep sewage channels and channels wherein the liquid sewage level may rise a considerable distance above the normal operating level. In such channels, if a horizontal screen bar and a vertically disposed combined transfer and comminuting unit is used, the motor which drives the rotary shaft of the comminuting unit has to be positioned so high above the unit that an extension shaft would be required. Such shafts are objectionable because of whipping and other problems. When the vertical screen bar arrangement is used the transfer and comminuting unit is disposed horizontally and is made to traverse the face of the screen in a completely submerged state.

The cutting cylinder of the combined transfer and comminuting unit is made of a plurality of separate parts that are easily machined so that the replacement of any part of the cutting cylinder is easy and inexpensive.

A feature of the invention resides in providing the transfer and comminuting unit with pivot means which enable it to be swung from a region adjacent the face of the screen to a region out of the sewage, so that the unit may be inspected and repaired without emptying the influent channel of sewage.

The rotation of the cutting cylinder is at a relatively high speed, and, while each tooth cuts only a small bit out of any solid, the comminution of each solid to the desired size is rapid. Any fibrous material, such as rags, in the sewage is abraded into very short fibers which tend to form a bulky floc that apparently assists in the purification of the sewage in the settling tank.

In the horizontal screen bar arrangement, the motor reciprocating the transfer and comminuting unit across the face of the screen is reversed automatically as the unit reaches each end of the screen, and the motor or other means utilized for oscillating the pair of combs is synchronized to oscillate the combs each time the direction of travel of the unit is reversed. The motor rotating the shaft of the cutting cylinder is also synchronized to reverse automatically at the same time. In the vertical screen bar arrangement, the motor reciprocating the unit across the screen is replaced by a motor operating a winch or other means which lifts the unit along the face of the screen the required distance, and then reverses to permit the unit to move downwardly along the face of the screen by gravity until it reaches the bottom limit of its travel, when it is again reversed. The motor for rotating the cutting cylinder and the means for oscillating the combs are synchronized with the motor operating the winch to reverse at the same time.

The structure by which the above mentioned and other advantages of the invention are attained will be described in the following specification, taken in conjunction with the accompanying drawings showing two preferred illustrative embodiments, in which:

Fig. 4 is a vertical cross sectional view, with parts in elevation, of the screen and combined transfer and comminuting unit in operative position;

Fig. 5 is a horizontal cross sectional view taken along the line 5—5 of Fig. 4, showing, in solid and dotted lines, the position of the parts as the transfer and comminuting unit travels in opposite directions;

Fig. 6 is a fragmentary detail perspective view showing one end of one of the screen bars;

Fig. 7 is a cross sectional view taken along the line 7—7 of Fig. 4;

Fig. 8 is a fragmentary detail perspective view showing the base of the screen-supporting structure and the lower portion of the cutting comb and related structure in disassembled position;

Fig. 9 is an enlarged fragmentary perspective view of portions of the screen, cutting cylinder, and combs, showing their operative relationship;

Fig. 10 is a fragmentary perspective view showing a portion of the face of the comb;

Fig. 11 is a detail perspective view of one of the spacers and cutting disks forming part of the cutting cylinder;

Fig. 12 is a partial plan view of one of the abrading strips which are secured to the periphery of each spacer between the cutting disks;

Fig. 13 is a fragmentary perspective view of the influent channel, a stationary transverse screen extending across the channel with its screen bars arranged vertically, and a combined transfer and comminuting unit reciprocally mounted in front of the screen;

Fig. 14 is a fragmentary perspective view, on an enlarged scale, of a portion of the screen and combined transfer and comminuting unit, taken along the line 14—14 of Fig. 13;

Fig. 17 is an enlarged sectional view, taken along the line 17—17 of Fig. 15;

Fig. 18 is an enlarged cross sectional view, taken along the line 18—18 of Fig. 16; and Fig. 19 is a diagrammatic view of the hydraulic system for operating the fluid motor which rotates the shaft of the cutting cylinder and the cylinder and piston which oscillate the combs.

Figure 1:
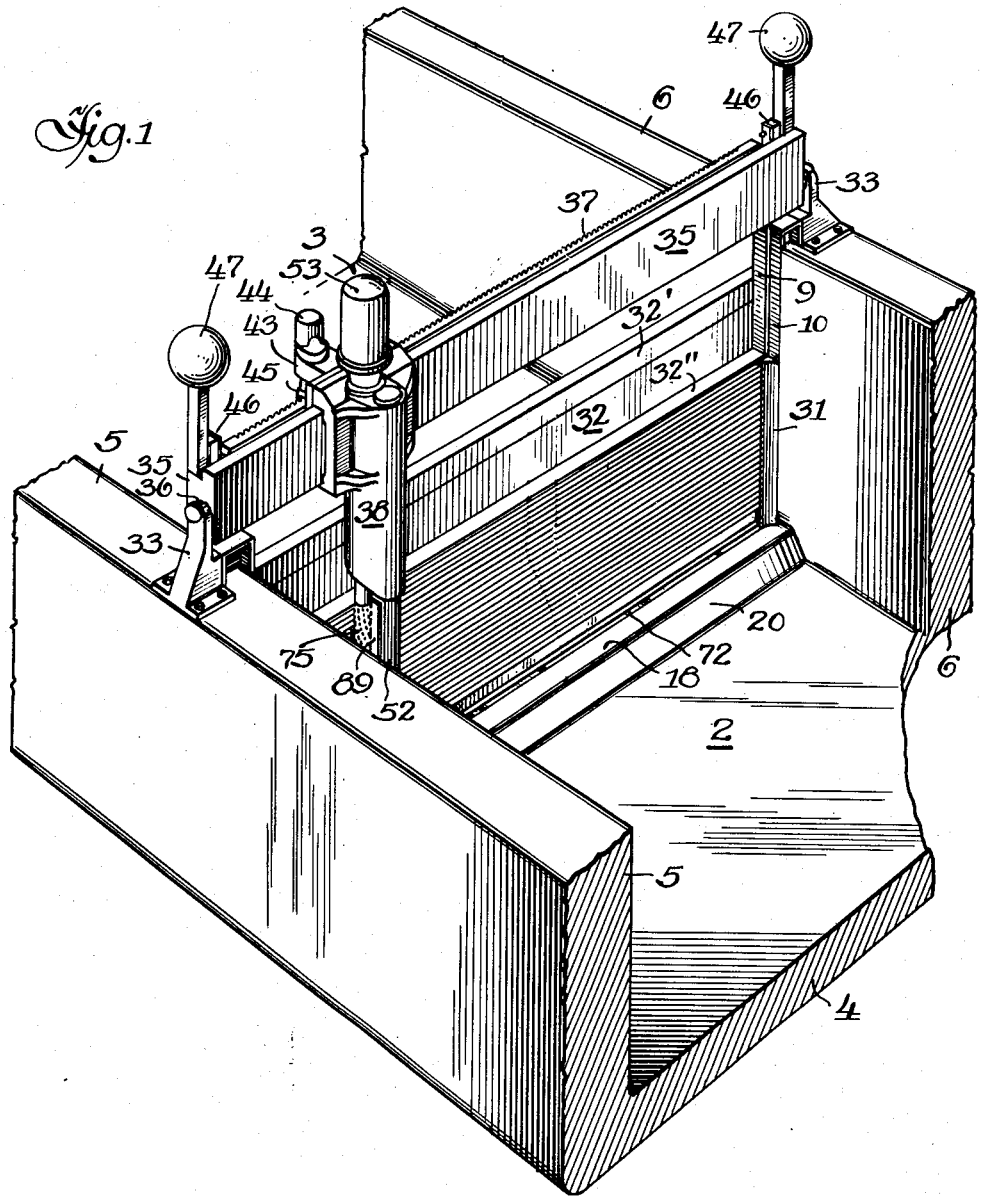
Figure 1 is a fragmentary perspective view of a channel through which sewage flows, a stationary transverse screen having screen bars extending horizontally across the channel, and a combined transfer and comminuting unit reciprocally mounted in front of the screen, all in accordance with the present invention.
Figure 2:
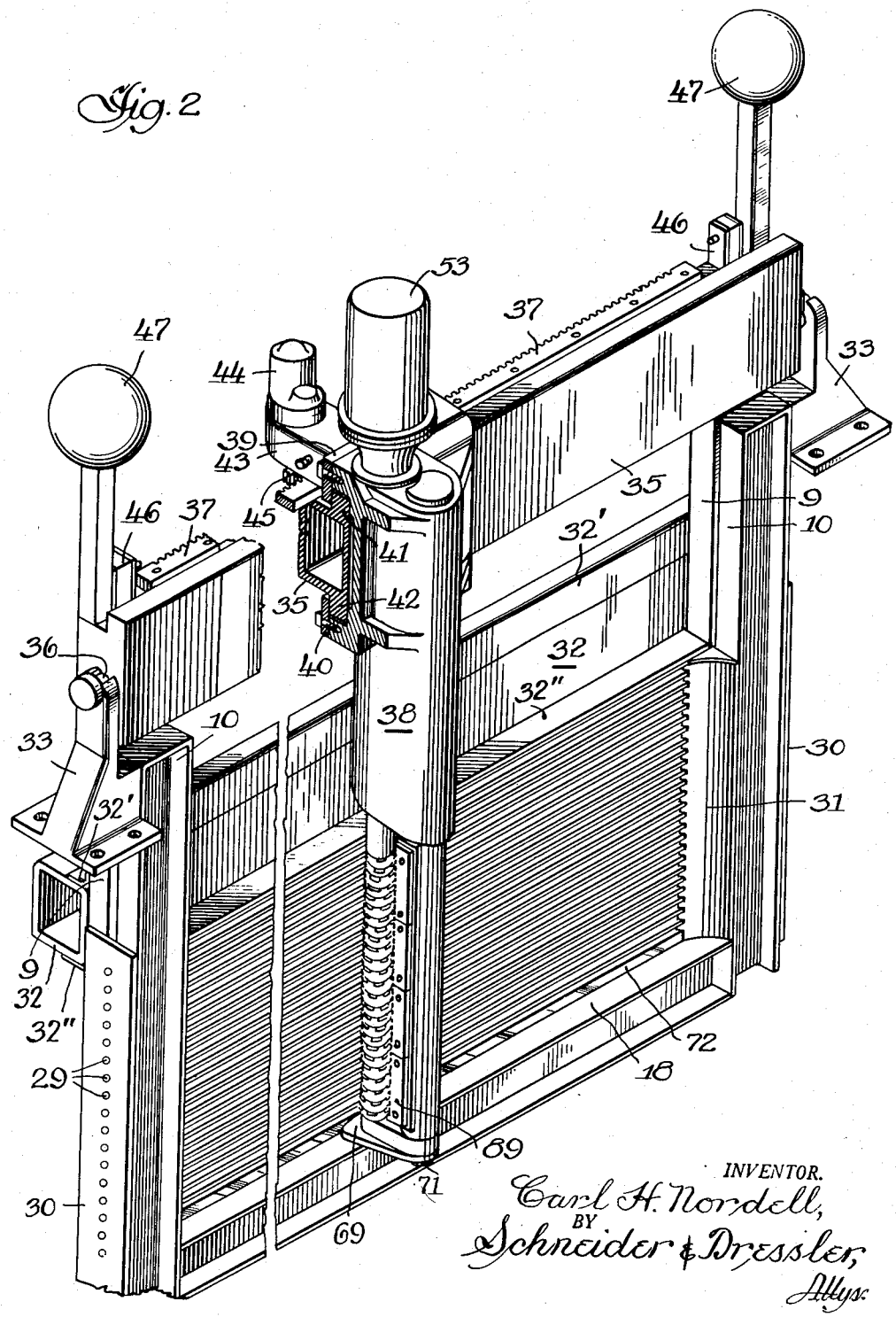
Fig. 2 is an enlarged fragmentary perspective view of the screen and combined transfer and comminuting unit.
Figure 3:
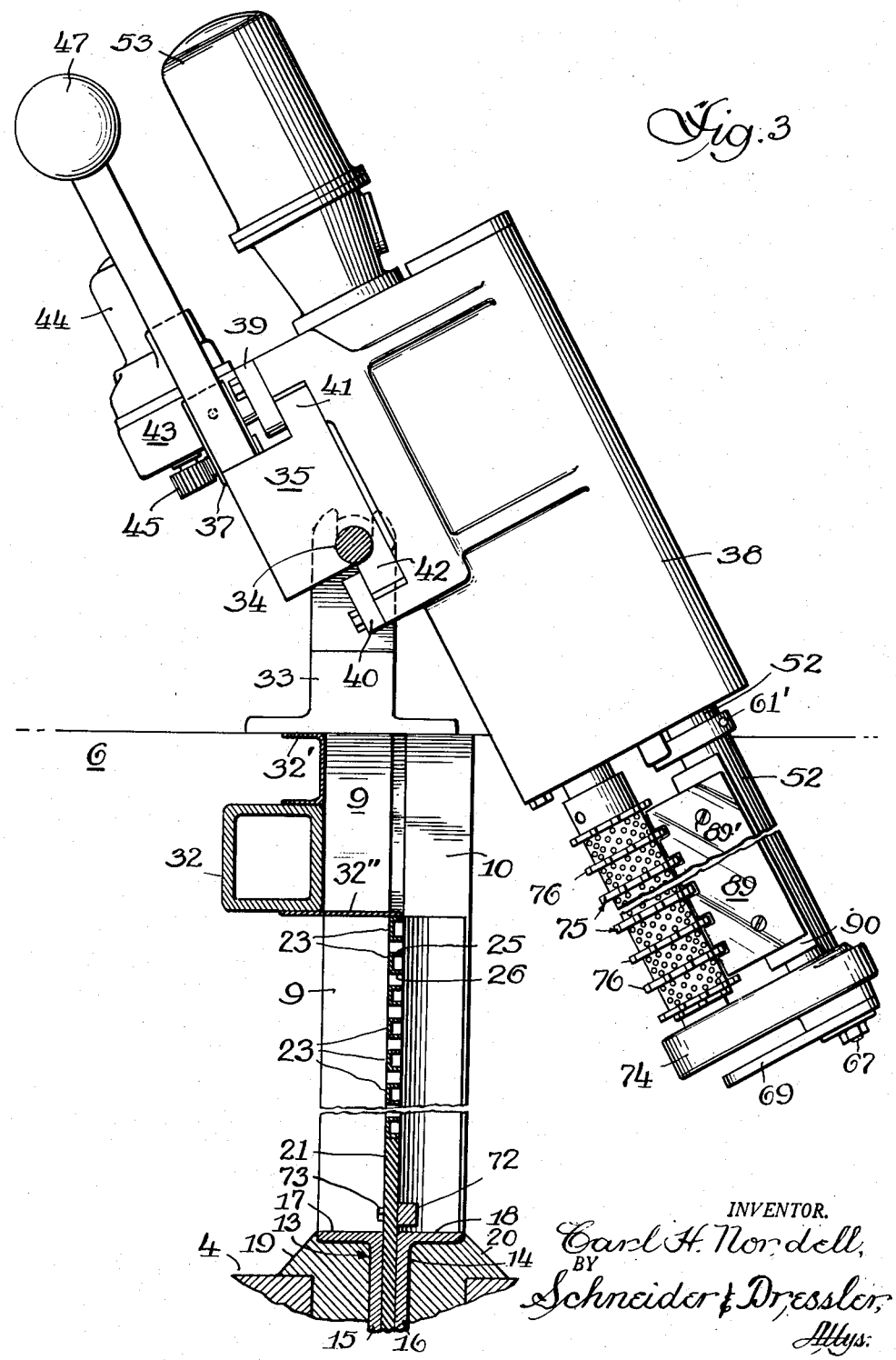
Fig. 3 is a vertical cross sectional view through the screen, showing in elevation the transfer and comminuting unit pivoted out of cooperative relationship with the screen.

Referring to the embodiment of the invention having horizontal screen bars, and to Figs. 1 to 12 of the drawings, reference numeral 2 indicates an influent channel through which flows unscreened sewage carrying solids, and 3 indicates the effluent channel through which the screened sewage flows. Channels 2 and 3 are parts of a single structure, preferably made of concrete, comprising a bottom wall 4 and side walls 5 and 6. Recesses 7 and 8 in side walls 5 and 6 each have a pair of upstanding channel irons 9 and 10 arranged therein with their web portions 11 and 12 spaced apart a distance approximately equal to the thickness of the screen, hereinafter described.

The bottoms of channel irons 9 and 10 are riveted or otherwise secured to channel irons 13 and 14 which are laid on their sides in the bottom wall 4. Channel irons 13 and 14 have their webs 15 and 16 spaced apart a distance approximately equal to the thickness of the screen and their side walls 17 and 18 are somewhat higher than the level of bottom wall 4. Preferably the space between side walls 17 and 18 of channel irons 13 and 14 and bottom wall 4 of channels 2 and 3 is filled with concrete to provide abutments 19 and 20. Abutment 20 is sharp enough to cause rocks and other solids that cannot be comminuted to pile up against but not on it.

A flat plate 21 is positioned between channel irons 13 and 14 and projects a slight distance above their side walls 17 and 18. Individual screen bars 22 are positioned above plate 21 in spaced relation, one above the other, with their opposite ends projecting into the spaces between channel irons 9 and 10, thus forming a screen across the channel through which the liquid sewage, small solids and comminuted solids pass from the influent channel to the effluent channel.

As shown in Fig. 6, each screen bar 22 comprises a U-shaped member 23 having a plug 24 secured in each end between side walls 25 and 26. Plugs 24 are each provided with a threaded aperture 27 adapted to receive the threaded end of a rod 28, as shown in Fig. 5. The headed end of rods 28 are positioned by means of a series of apertures 29 (Fig. 2) in plates 30 secured to side walls of channel irons 9 and 10. Screen bars 22 are arranged in the desired spaced relationship one above the other, with the U-shaped portions extending towards the inflowing sewage. Deflector plates 31 (Fig. 2) are provided along the outer edges of the screen.

The top ends of channel irons 9 are tied together by reinforcing members 32 and 32'. A flat plate 32'' extending from the top of the uppermost screen bar 22 to the underside of reinforcing member 32 prevents the sewage from flowing over the top of the screen if the level of the sewage should rise above the screen. A bracket 33 secured to the side walls of channel irons 9 and 10 is bolted to the top of the side walls 5 and 6 at opposite ends of the screen-supporting structure. The upper end of each bracket 33 is provided with a bearing 34 (Fig. 3) in which opposite ends of the structure supporting the combined transfer and comminuting unit are trunnioned.

A cross bar 35, positioned above the screen-supporting structure, is provided with laterally projecting studs 36 seated in bearings 34. A rack 37 is secured to the top wall of cross bar 35. A vertically disposed housing 38 is slidably mounted on cross bar 35 by means of strips 39 and 40 engaging flanges 41 and 42 which project vertically from the top and bottom of member 35. An arm 43 extending rearwardly from the top of housing 38 supports a reversible motor 44 which operates a pinion gear 45 in engagement with rack 37. Motor 44 is controlled by a trip switch 46 at each end of cross bar 35 which reverses the motor automatically so that housing 38, and its associated structure, is continuously reciprocated horizontally along cross bar 35. The housing may be reciprocated by hydraulic means instead of by the motor 44, if desired.

Studs 36, seated in bearings 34, permit pivotal movement of cross bar 35, housing 38, and the combined transfer and comminuting unit, hereinafter described, associated therewith. Counterweights 47, mounted on opposite ends of cross bar 35 in any suitable manner, facilitate the pivotal movement of the combined transfer and comminuting unit so that it may be swung out of the sewage for inspection and service without emptying channel 2 or dismantling the entire unit.

Top wall 48 of housing 38 has bearings 49 and 50 mounted therein. A shaft 51 has its upper end mounted in bearing 49, and a shaft 52, parallel to shaft 51, has its upper end mounted in bearing 50. A reversible motor 53, mounted on top wall 48, rotates shaft 51 through a coupling 54 in a direction such that the points in its periphery closest to shaft 52 move in the direction opposite to the direction of travel of the housing 38 and its associated structure, as indicated by the arrows in Fig. 5. The motor 53 is preferably wired in the same circuit as motor 44 and is reversed by the trip switches 46. Shafts 51 and 52 pass through bearings 55 and 56 in the bottom wall 57 of housing 38. Plate 58, bolted to bottom wall 57, holds bearing 55 in place. Another plate 59, positioned under bearing 56, is also bolted to bottom wall 57, as indicated at 60, Fig. 4.

A collar 61 is clamped to shaft 52 by means of a pin 61' just below plate 59, so as to move with shaft 52. Shaft 52 is oscillated, in a manner hereinafter described, once upon each reversal of direction of lateral movement of housing 38, and its oscillation in each direction is limited by a pair of stop members 62 and 63 carried by plate 59 (Fig. 7), against which studs 64 and 65 abut. Studs 64 and 65 are threaded into the flanged end 66 of collar 61, and the extent of oscillation of shaft 52 can be regulated by adjustment of studs 64 and 65.

The bottom of shaft 52 terminates in a threaded stud 67 having a square shank 68. A friction shoe 69 has a square aperture 70 for receiving shank 68. A nut 71 threaded on stud 67 holds shoe 69 in place on the shaft. Shoe 69 is shaped like a sector of a circle with its ends rounded, and the arc portion engages a guide strip 72. Guide strip 72 is bolted to plate 21, as indicated at 73, Fig. 3, and may be removed and replaced when it becomes worn.

An arm 74 positioned just above shoe 69, has a bearing 75' (Fig. 4) receiving the lower portion of shaft 52 immediately above shank 68. The other end of arm 74 has an aperture 76'. A watertight bearing 76", seated in aperture 76, receives the bottom of shaft 51.

The top surface of arm 74 is substantially flush with the top of plate 21. A plurality of annular disks 75 is mounted on shaft 51 between arm 74 and the top surface of the screen. Each disk 75 has a plurality of laterally extending teeth 76 spaced around its periphery, and spacers 77 are interposed between adjacent disks. Spacers 77 are of such a thickness as to place each disk 75 in alignment with the center of one of the screen bars 22. When the transfer and comminuting element is in operating relationship with respect to the screen, teeth 76 project between side walls 25 and 26 of screen bars 22.

A nut 78 (Fig. 4) screwed on shaft 51 above arm 74 holds the lowermost disk 75 in place. Each disk has a plurality of apertures 79, as seen in Figs. 9 and 11, and each spacer 77 has a corresponding recess 80. A pin 81 extending through an aperture 79 and seated in recess 80 maintains disks 75 in the proper position. Preferably disks 75 are arranged so that teeth 76 are staggered. A collar 82 secured to shaft 51 by means of a pin 83' holds the uppermost disk 75 in place.

Each spacer 77 has a collar 83 secured around its periphery by screws 84 passing through apertures 85 and threaded into recesses 86 in the periphery of the spacer. The outer surface of each collar 83 is roughened in any suitable manner, as indicated at 87, for a purpose hereinafter described.

A pair of combs 88 and 89 is secured to a supporting frame 90 on opposite sides of shaft 52 by means of screws 89'. Frame 90 is rigidly fixed to shaft 52 and its sides are shaped to make combs 88 and 89 converge towards shaft 51. Combs 88 and 89 are recessed on their forward edge, as indicated at 91, and teeth 76 project into recesses 91 as shaft 51 rotates. The edges of combs 88 and 89 between the recesses 91 are serrated to form teeth 93.

Combs 88 and 89 and disks 75 are each preferably made of hardened steel so that any solids intercepted by the screen that are caught between teeth 76 and teeth 93 are comminuted. It will be noted that the area in which the teeth 76 pass through recesses 91 adjacent the teeth 93 is spaced away from the screen on the upstream side so that the screen is not subjected to the excessive wear incidental to the comminution of the solids. After the intercepted solids are comminuted they are carried through the screen and into the effluent channel by the force of the regular flow of liquid sewage.

As previously mentioned, housing 38, and the combined transfer and comminuting unit associated therewith, move back and forth across the front of the stationary screen. The drag of friction shoe 69 along guide plate 72 holds the transfer and comminuting unit back slightly, so that shaft 52 rotates a few degrees at each change in the direction of travel of the transfer and comminuting unit and oscillates the leading comb into comminuting position. As shown in Fig. 5, this drag causes the teeth of comb 88 to cooperate with teeth 76 when the transfer and comminuting unit is traveling to the right, and the teeth of comb 89 to cooperate with teeth 76 when the unit is traveling to the left, the direction of rotation of the teeth 76 being reversed, as shown by the arrow in Fig. 5. When the teeth of one comb are cooperating with teeth 76, the teeth of the other comb are spaced from teeth 76 and out of cooperating relationship therewith.

It will be understood that the shaft 52 may be oscillated the few degrees necessary to alternately bring the combs 88 and 89 into comminuting relationship with the cutting cylinder in any suitable manner. For example, either an electric motor or hydraulic means can be substituted for the friction shoe 69. It is preferred that the oscillation of combs 88 and 89 should be slow enough to permit a substantial portion of the solid matter accumulated on the cutting cylinder to be thrown off the cylinder upon reversal of motor 53 so as to prevent an excessive overload on the system when either comb moves into comminuting position.

Shaft 51 rotates at considerable speed so that a substantial force is exerted against any solids held against comb 88 or 89 and engaged by teeth 76 rotating through recesses 91. However, regardless of the speed of rotation of shaft 51, fibrous material, such as rags, is often held against the screen in such position that it is not dislodged by teeth 76. The roughened surface of collars 83 rotating very close to the tops of side walls 25 and 26 of screen bars 22 collects fibrous material which is in the sewage stream and which has been picked up by the teeth 76 and partly comminuted. This fibrous material becomes wound around the collars, and when it builds itself up to a thickness sufficient to engage the tops of side walls 25 and 26 of the screen bars it acts as a brush, or wiper, to wipe the surface of the screen bars and keep the spaces between adjacent screen bars clean so that the comminuted material can flow freely through the screen. In the process of wiping the surface of the screen bars, the brush of fibrous material becomes partially comminuted and wears down. However, it continues to collect additional fibrous material so that it is constantly renewed and continuously wipes the surface of the screen bars. Comminution of the brush is also effected by the engagement thereof by teeth 93 which are cut in the faces of combs 88 and 89 disposed on opposite sides of notches 91.

This comminuted fibrous material forms a floc in the preliminary settling tank that serves to settle much of the fine colloidal and suspended material which would otherwise pass through this tank unsettled. Heretofore, attempts to increase the efficiency of the primary settling tank by adding a fibrous pulp have been unsuccessful because when the pulp is ground outside of the sewage it becomes matted and clotted, and will not separate into minute fibers again when added to the sewage. The present method of continuously forming the pulp in the flow of sewage from the fibrous material normally present in the sewage, eliminates this difficulty and accomplishes the desired result in an inexpensive manner.

When the combined transfer and comminuting unit is swung out from the sewage, and inspection shows that some teeth 76 are worn or broken, it is a simple matter to disassemble the disks 75 and spacers 77, and replace the disks having defective teeth. The replacement of individual disks is much less expensive than when all the teeth are formed on an integral unit, as heretofore.

In the embodiment of the invention illustrated in Figs. 13 to 19, the reference numeral 102 indicates the influent channel, and 103 indicates the effluent channel. As in the embodiment illustrated in Figs. 1 to 12, channels 102 and 103 are parts of a single structure, preferably made of concrete, comprising a bottom wall 104 and side walls 105 and 106. A screen 107 comprising a plurality of vertically extending screen bars 108 extends transversely across channel 102. Although the screen is shown as sloping forwardly towards the bottom wall 104, it will be obvious that it may be arranged perpendicularly, if desired. The screen may be provided with a plurality of reinforcing members 109. These reinforcing members are provided with projections 109' which fit in the spaces between the screen bars. The projections 109' extend substantially to the top edge of the side walls of the individual screen bars. The reinforcing members 109 are disposed horizontally transversely to the screen bars and preferably are spaced at intervals of about 18 inches. They serve to prevent the screen bars from bowing away from the cutting cylinder as well as to keep the screen bars aligned longitudinally so that the teeth of the cutting cylinder always engage the space inside the individual screen bars. It will be obvious that when the screen bars extend horizontally, as in the embodiment illustrated in Figs. 1 to 12, the reinforcing members, if used, are disposed vertically. The projections 109' may be integral with the reinforcing members 109, or may be formed separately and welded thereto. If desired, the reinforcing members 109 may be formed of a strip of steel bent to form the projections fitting in the spaces between the screen bars.

The sides of the frame are reinforced by members 110 and 111 against which the combined transfer and comminuting unit 113 slides. The ends of screen bars 108 may be secured to the upper and lower reinforcing members 109 in any suitable manner. Preferably screen 107 is constructed similarly to the screen shown in the embodiment of Figs. 1 to 12, except that the screen bars are arranged vertically instead of horizontally.

The combined transfer and comminuting unit 113 is substantially similar to the combined transfer and comminuting unit shown in the embodiment of Figs. 1 to 12, except that it is arranged horizontally relative to the screen instead of vertically. The unit comprises a rotatable cutting cylinder 114 and a pair of combs 115 and 116. Cutting cylinder 114 comprises a shaft 117 to which a plurality of annular disks 117' is secured. Each of the disks has a plurality of teeth 117' projecting therefrom, and the disks are arranged on the shaft in such a manner that the teeth of each disk are staggered relative to the teeth of the adjacent disks. Combs 115 and 116 have projections 115' and 116', respectively, projecting from their edges adjacent the cutting cylinder. Notches 115'' and 116'' between the projections are so spaced that when either comb is positioned in comminuting position relative to the cutting cylinder, the teeth 117'' will pass through the notches of that comb as the cutting cylinder is rotated.

The shaft 117 is mounted in suitable bearings 118 and 119, and is rotated by a fluid motor 120 operated by a hydraulic system hereinafter described, and shown diagrammatically in Fig. 19. Motor 120 drives a gear 121 which is meshed with a gear 122 rigidly mounted on shaft 117. Bearing 118 is contained in a housing 123 at one end of shaft 117, and bearing 119 is contained in another housing 124 at the opposite end of shaft 117. The housings 123 and 124 are connected together by a rigid reinforcing member 125 which has its opposite ends each rigidly secured to one of the housings. The motor 120 is reversible so as to change the direction of rotation of the cutting cylinder 114 in accordance with the direction of travel of the combined transfer and comminuting unit 113 along the face of screen 107. As viewed in Fig. 14, when unit 113 is moving upwardly along the screen, the shaft 117 is rotated in the direction of the arrow, and comb 115 is in comminuting position. When unit 113 is moving downwardly, the shaft 117 is rotated in the opposite direction, and comb 116 is in comminuting position. The means for oscillating the combs to position them alternately into comminuting position will be hereinafter described in connection with the hydraulic system by which said means is operated.

The mechanism for raising the unit 113, and the associated housings 123 and 124, along the screen 107 comprises a pair of winches 126 operated by an electric motor 127. Motor 127 and winches 126 are mounted on a platform 128 extending across the top of channel 103. Each end of the unit 113 is provided with a bracket 129 rigidly secured to housings 123 and 124. A strap 130 secured to the upper end of each bracket 129 embraces a guide bar 131 so as to slide therealong. The guide bars are supported in spaced relationship to the front of screen 107 by means of supporting strips 132. The ends of cables 133 extending from the winches 126 are secured to the straps 130. When the motor driving the winches is reversed, the weight of unit 113 causes it to move downwardly along the screen. The speed at which the unit moves downwardly is controlled so that it is the same or approximately the same as its speed in the opposite direction. The cables are guided by pulleys 134 supported on a frame 135 mounted on side walls 105 and 106.

A pair of trip switches 136 and 137 is mounted on one side of frame 135 and the cable 133 which lies adjacent that portion of the frame is provided with clips or projections 138 and 139. The clips are securely fastened to the cable so that when the cable moves far enough to cause either clip to engage one of the trip switches it will trip the switch. When the unit 113 is moving downwardly and reaches the lower limit of its travel, clip 138 engages switch 136 and trips it to reverse motor 127. When unit 113 reaches the upper limit of its travel clip 139 trips switch 137 to again reverse motor 127.

Comb 115 is secured to a plate 140 by means of a plurality of screws 141, and comb 116 is similarly secured to a plate 142. Plates 140 and 142 are each rigidly secured to a shaft 143 in such position that only one comb is in comminuting position at one time. The shaft 143 is mounted in bearings 144 and 145 carried respectively by housings 123 and 124 which also carry bearings 118 and 119. The housings 123 and 124 bear against members 110 and 111 as the transfer and comminuting unit 113 is reciprocated in front of screen 107. The housings 123 and 124 are positioned at the sides of screen 107 and the space therebetween, in back of reinforcing member 125, is open to permit teeth 117″ to engage screen bars 108 to remove solids held against the screen by the flow of sewage. Teeth 117″ carry these solids around to the area spaced in front of the screen into engagement with one of the combs 115 or 116. The solids are comminuted in this area by the interaction of teeth 117″ with the cutting surfaces of notches 115″ or 116″ of either comb 115 or 116. The shaft 143 is oscillated each time the direction of longitudinal travel of unit 113 along screen 107 is reversed, so as to move combs 115 and 116 alternately into comminuting position in accordance with the direction of rotation of cutting cylinder 114.

Shaft 143 may be oscillated by any suitable means, for example, frictionally, as noted in connection with the embodiment of the invention shown in Figs. 1 to 12, but the preferred means comprises the hydraulic system shown diagrammatically in Fig. 19. Referring to Figs. 13 and 19, the hydraulic system comprises an electric motor 144 which operates a pump 145. The wires 146 which energize motor 144 are wired to a control box 147 which also controls wires 148 which energize motor 127. Motors 127 and 144 are synchronized, so that when the combined transfer and comminuting unit 113 is moving upwardly along screen 107, shaft 117 is being rotated in the direction of the arrow shown in Fig. 14. When the clip 139 trips switch 137 both motors 127 and 144 are reversed so that unit 113 moves downwardly and the pump 145 is reversed.

One side of pump 145 is connected to an oil reservoir 149 by a line 150 provided with a check valve 151 and leading to line 152. The end of line 150 leading from the reservoir is provided with an oil filter 150′. Oil sucked up through lines 150 and 152 is pumped through line 153, through check valve 154, and into a pipe 155 leading to the center of a conventional automatic slack-takeup reel 156. A flexible hose 157 wound on reel 156 carries the oil from pipe 155 to lines 158 and 159. The flexibility of hose 157 permits the unit 113 to reciprocate along the face of screen 107 without interrupting the flow of oil through the hydraulic system. Line 158 leads to a cylinder 160 (Fig. 15) which contains a piston 161. When sufficient oil has flowed into cylinder 160 to move the piston to the limit of its travel, the oil pressure maintains the piston in position, and the rest of the oil flowing from pipe 155 flows through line 159 to operate motor 120 continuously until the motor 144 is reversed. The fact that oil pressure holds the piston 161 in position enables either comb 115 or 116 to back away slightly from cutting cylinder 114 if too much solid matter accumulates against the comb, thereby protecting the teeth 117″ from breaking and also preventing injury to the comb.

Oil passing through fluid motor 120, which rotates shaft 117, passes through line 162 into flexible hose 157′ wound on reel 156′, which is a duplicate of reel 156, and through pipe 163 leading from the center of reel 156′ to line 164. The oil flows from line 164 to line 165 and through a three way valve 166. The oil must normally flow through valve 166 because the check valve 167 is set for high pressure so that it acts only as a relief valve. The valve 166 comprises a cylinder 168 and a piston 169. The piston is reciprocated in the cylinder by solenoids 170 controlled by control box 147 and synchronized with motors 127 and 144 so that the piston is in the position shown in Fig. 19 when pump 145 is operating in the direction hereinabove described. The wires 171 which energize the solenoids 170 are connected to wires 146 which energize motor 144. The position of piston 169 shown in Fig. 19 allows the oil from line 165 to flow through valve 166 into line 172 and back into reservoir 149.

As can be seen by an inspection of Fig. 19, the hydraulic system contains duplicate lines on the opposite side of pump 145 so that the operation previously described is reversed when motor 144 is reversed. The effect of such reversal is to move piston 161 (Fig. 15) to the opposite end of cylinder 160 and to reverse the direction of rotation of shaft 117 by reversing motor 120. The hydraulic system also includes a pump drain 173 leading from the pump 145 to the reservoir 149.

Figure 15:
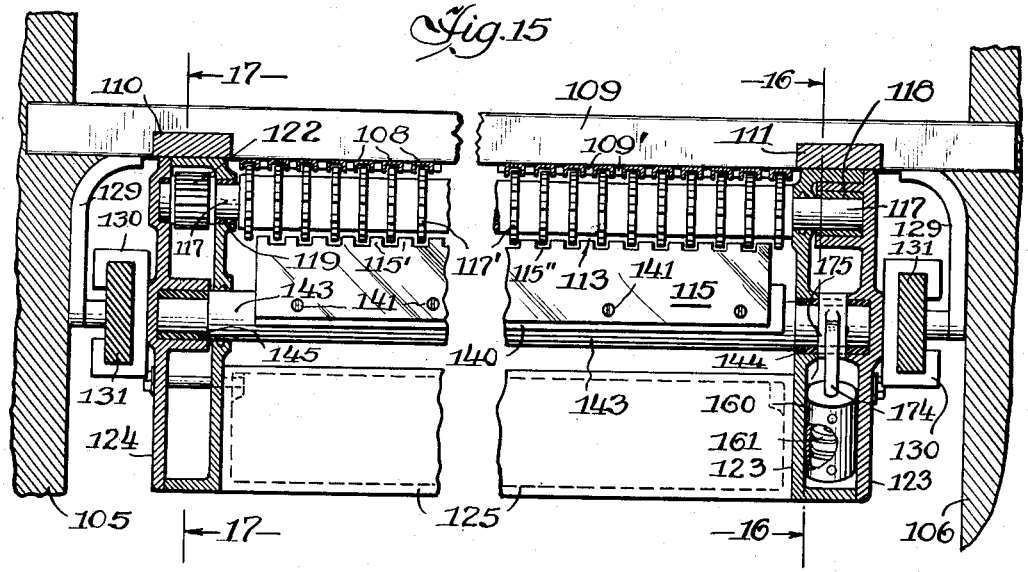
Fig. 15 is a fragmentary plan sectional view, looking downwardly from above the top of the screen and taken generally along the line 15—15 of Fig. 13, showing the screen, combined transfer and comminuting unit, and the cylinder and piston for oscillating the combs.
Figure 16:
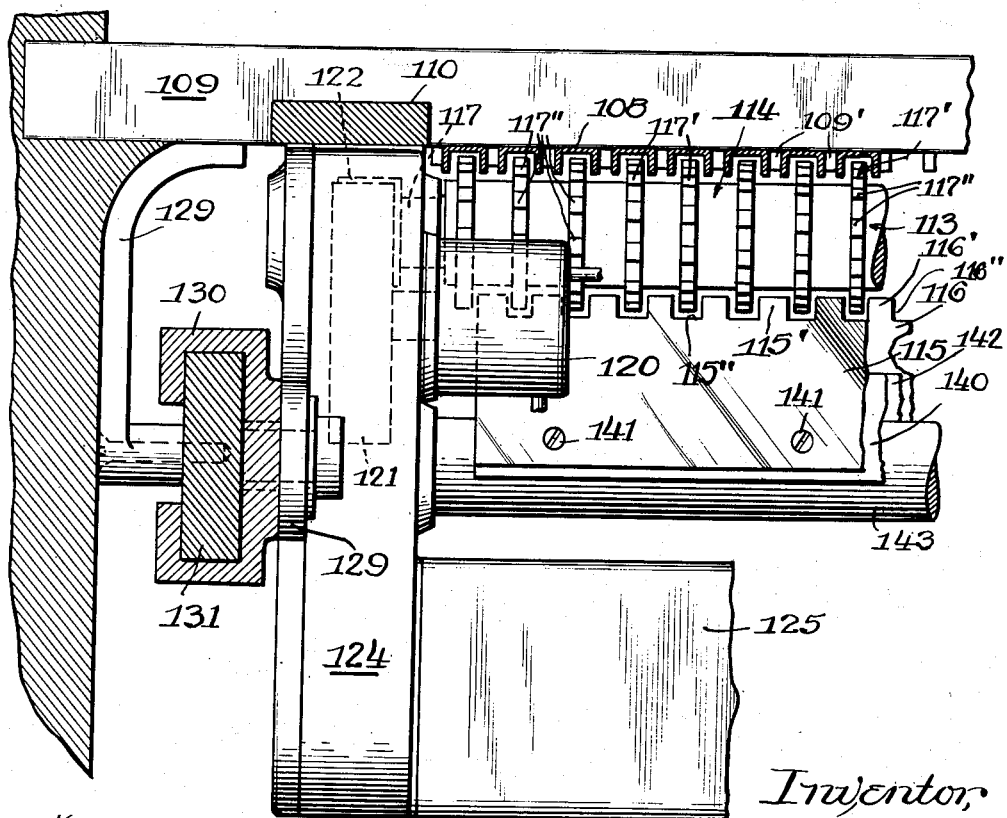
Fig. 16 is an enlarged sectional view, taken along the line 16—16 of Fig. 15.

Referring to Figs. 15 and 16, the cylinder 160 is mounted in housing 123. The piston rod 174 projecting from piston 161 extends through one end of cylinder 160 and is connected to a bifurcated arm 175 rigidly secured at its other end to shaft 143. Reciprocation of piston rod 174 moves arm 175, thereby oscillating shaft 143. As described in connection with the operation of the hydraulic system, piston 161 is moved to the opposite end of cylinder 160 when motor 144 is reversed, and is held there by oil pressure until motor 144 is again reversed. Each reversal moves one of the combs 115 or 116 into comminuting position, and the other comb out of comminuting position, and keeps them there until the rotation of the cutting cylinder is reversed.

It is evident from the foregoing description, as illustrated by the preferred embodiments of the invention shown in the drawings, that in accordance with the invention screened solids are removed from the screen by the cutting cylinder of the combined transfer and comminuting unit. The roughened surfaces of the cutting cylinder positioned between the disks carrying the cutting teeth forms a core about which fibrous material wraps itself and this wrapped core serves as a brush or wiper to remove the fibrous material that adheres to the top of the side walls of screen bars 22 and 108 and is not dislodged by the teeth 76 or 117". This fibrous material becomes abraded and worn but builds itself up continuously so that it forms a constantly renewed brush or wiper to keep the space between the individual screen bars clean. The solid matter picked up by the teeth of the cutting cylinder are transferred from the screen by the cutting cylinder to the area where the combs are positioned, and are then comminuted by the interaction of the combs with the teeth. This comminuting action takes place in the sewage stream, upstream of and away from the face of the screen. In this way the strain on the screen is reduced to a minimum.

While I have described two preferred embodiments of the invention in considerable detail, it will be understood that the description is intended to be illustrative, rather than restrictive, as many details may be modified or changed without departing from the scope of the appended claims. Accordingly, I do not desire to be restricted to the exact structures described.

I claim:

1. In combination with a channel through which sewage containing solids is flowed, a screen extending across said channel, and a combined transfer and comminuting unit comprising a cutting cylinder mounted in cooperative relationship with said screen and directly in front of said screen and a cooperating cutting comb spaced from said screen a distance greater than the radius of said cutting cylinder, said unit being movable transversely in front of said screen to remove solids therefrom.

2. In combination with a channel through which sewage containing solids is flowed, a screen extending across said channel, said screen comprising a plurality of screen bars arranged parallel to each other, and a transfer and comminuting unit comprising a cutting cylinder mounted in cooperative relationship with said screen and directly in front of said screen and a cooperating cutting comb spaced from said screen a distance greater than the radius of said cutting cylinder, said unit being movable across the front of said screen in a direction parallel to said screen bars to remove solids therefrom.

3. In combination with a channel through which sewage containing solids is flowed, a screen extending across said channel, said screen comprising a plurality of screen bars arranged in parallel relationship and disposed vertically relative to said channel, a transfer and comminuting unit comprising a cutting cylinder mounted in cooperative relationship with said screen and directly in front of said screen and a cooperating cutting comb spaced from said screen, and means for raising said unit along said screen to cause said unit to sweep the face of said screen to remove solids therefrom.

4. In combination with a channel through which sewage containing solids is flowed, a frame extending across said channel, a screen mounted in said frame, a transfer and comminuting unit mounted in a housing slidably mounted on said frame, said unit being positioned a short distance in front of said screen, a motor operable to move said unit across said frame, and a trip switch at each end of said frame, each of said switches being operable automatically upon contact with said housing to reverse the direction of said motor and thereby reciprocate said unit across the face of said screen.

5. In combination, a screen for straining sewage, a frame supporting said screen, a transfer and comminuting unit slidably mounted on said frame, said unit comprising a rotatable cylinder having a plurality of teeth projecting from its periphery into engagement with said screen, an oscillatable shaft, and a pair of combs mounted on said shaft, a motor for reciprocating said unit across the face of said screen, and means for oscillating said shaft, one of said combs cooperating with said teeth as said unit is moved in one direction, and said other comb cooperating with said teeth as said unit is moved in the opposite direction.

6. In combination with a screen comprising a plurality of parallel screen bars for straining sewage, a transfer and comminuting unit comprising a rotatable shaft, a plurality of disks mounted on said shaft, each of said disks having a plurality of teeth projecting from its periphery, a plurality of spacers interposed between said disks, said rotatable shaft being positioned adjacent said screen whereby said teeth remove solids from the front of said screen, a comb positioned in the path of rotation of said teeth, said comb cooperating with said teeth to comminute solids removed thereby from said screen, and a roughened surface on each of said spacers, said roughened surfaces passing close enough to the surface of the screen bars during the rotation of said shaft to remove fibrous material intercepted by said screen from the surface of said screen bars, each of said roughened surfaces wrapping said fibrous material around said surfaces until it builds itself into a constantly renewed brush to wipe the surface of the screen bars, thereby keeping the spaces between adjacent screen bars free for the passage of comminuted solids therethrough.

7. In combination with a screen for straining sewage, a transfer and comminuting unit slidably mounted to move back and forth across the face of said screen, said unit comprising a rotatable shaft, a plurality of spacers mounted on said shaft, a roughened surface on each of said spacers, said rotatable shaft being positioned adjacent said screen, said roughened surfaces passing close enough to the surface of the screen during the rotation of the shaft to remove fibrous material, intercepted by the screen from the sewage, from the screen, each of said roughened surfaces wrapping said fibrous material about itself to form a brush which wipes the surface of said screen, said brush constantly renewing itself by collecting additional fibrous material from the sewage.

8. In combination with a screen for straining sewage, a frame supporting said screen, a transfer and comminuting unit slidably mounted on said frame, means for moving said unit back and forth across the face of said screen, said unit comprising a rotatable cylinder having teeth projecting from its periphery, a shaft oscillating once at each reversal of direction of sliding movement of said unit, and a pair of combs mounted on said shaft and alternately movable into operative position as said shaft oscillates, said teeth passing between recesses in the comb in operative position as said cylinder rotates.

9. In combination with a screen for straining sewage, a frame supporting said screen, a transfer and comminuting unit comprising a rotatable cylinder formed of a plurality of toothed disks separated by spacers, said toothed disks engaging said screen to remove solids therefrom during rotation of said cylinder, and a comb cooperating with said toothed disks for comminuting solids removed from said screen in an area spaced from the screen, said unit being pivoted to said frame to swing out of said sewage for inspection and repairs.

10. In combination, a frame having side walls each comprising a pair of upstanding members spaced from each other, a screen for straining sewage, said screen comprising a plurality of U-shaped screen bars having their open sides faced in the same direction, each screen bar having its ends secured in the spaces between said upstanding members, and a transfer and comminuting unit comprising a rotating cylinder having a plurality of teeth projecting laterally from its periphery, and a comb cooperating with said teeth to comminute solids engaged therebetween, said unit being pivoted on said frame to bring said cylinder into proximity with said screen, said teeth being vertically aligned with said screen bars whereby they pass through the open sides of said screen bars as said cylinder rotates.

11. In combination, a frame having side walls each comprising a pair of upstanding members spaced from each other, a screen for straining sewage, said screen comprising a plurality of U-shaped screen bars having their open sides faced in the same direction, each screen bar having its ends secured in the spaces between said upstanding members, a transfer and comminuting unit comprising a rotating cylinder having a plurality of teeth projecting laterally from its periphery, and a comb cooperating with said teeth to comminute solids engaged therebetween, said unit being slidably mounted on said frame and pivoted to permit it to swing from a position in proximity to said screen, in which said teeth rotate through the open sides of said screen bars, to a position out of said sewage to facilitate inspection and repair of said unit, and means to reciprocate said unit across the face of said screen.

12. In combination, a frame having side walls each comprising a pair of upstanding members spaced from each other, a screen for straining sewage, said screen comprising a plurality of channel bars having their open sides faced toward the stream of inflowing sewage, each screen bar having its ends secured in the spaces between said upstanding members, a transfer and comminuting unit comprising a rotatable cylinder having a plurality of teeth projecting laterally from its periphery and a pair of combs spaced from said cylinder and movable alternately into operative position wherein recesses in one of said combs are in the path of travel of said teeth as said cylinder rotates, said unit being pivoted on said frame to position said cylinder in proximity to said screen so that said teeth pass between said open sides of said channel members as said cylinder rotates, said teeth removing solids from the face of said screen and comminuting them between the recesses of said combs.

13. In combination, a screen, a frame supporting said screen, a transfer and comminuting unit slidably mounted on said frame, and means reciprocating said unit across the face of said screen, said unit comprising a rotatable shaft positioned in proximity to said screen, a second shaft parallel to and spaced from said rotatable shaft, a pair of combs mounted on said second shaft, and a friction shoe rigidly secured to said second shaft, said shoe rubbing across the bottom of said frame with sufficient friction to oscillate said second shaft at each reversal of direction of sliding movement of said unit, each of said oscillations being effective to move one of said combs into and the other of said combs out of operative position.

14. In combination, a screen, a frame supporting said screen, a comminuting element slidably mounted on said frame, means to reciprocate said comminuting element across the face of said screen in operative engagement therewith, said comminuting element comprising a rotatable shaft positioned in proximity to said screen, and a comb cooperating with said comminuting element for comminuting solids, and means providing a pivotal mounting for said comminuting element whereby the said element may be swung upwardly for inspection and repairs.

15. In combination, a screen for screening sewage, a frame supporting said screen, a transfer and comminuting unit slidably mounted on said frame, means to reciprocate said unit across the face of the screen in operative engagement therewith, said unit comprising a vertically disposed rotatable cutting element positioned in proximity to said screen and a comb cooperating with said cutting element for comminuting solids in said sewage, and means on said frame providing pivotal mounting for said unit whereby said unit may be swung upwardly out of the sewage for inspection and repairs.

16. In combination, a screen for screening sewage, a frame supporting said screen, a transfer and comminuting unit movably mounted adjacent said screen, means to reciprocate said unit along the face of said screen in operative engagement therewith, said unit comprising a horizontally disposed rotatable cutting element positioned in proximity to said screen, and a pair of combs cooperating with said cutting element for comminuting solids in said sewage, said pair of combs oscillating at every reversal of direction of travel of said unit to position said combs alternately into comminuting position.

17. In combination, a screen for screening sewage and a comminuting device mounted in front of said screen and cooperating therewith to remove solids therefrom, said comminuting device comprising a cutting cylinder and a comb which cooperate to comminute solids removed from the screen independently of said screen.

18. In combination, a screen for screening sewage and a transfer and comminuting unit mounted to reciprocate in front of said screen, the transfer element of said unit comprising a cutting cylinder rotatably mounted adjacent said screen and cooperating therewith to remove solids therefrom, the comminuting element of said unit comprising said cutting cylinder and a comb cooperating therewith, said comb being positioned in front of the screen a distance greater than the radius of said cutting cylinder so as to comminute solids removed from the screen independently thereof.

19. In combination, a screen for screening sewage, a transfer and comminuting unit mounted in front of said screen, means for moving said unit and screen relative to each other, said unit comprising a rotatable cylinder and a comb, said cylinder cooperating with said screen to remove solids therefrom while said relative movement is taking place, said rotating cylinder transferring said solids from said screen to an area spaced upstream from said screen, said comb cooperating with said cylinder in said area spaced upstream of said screen to comminute solids removed from the screen in said upstream area out of contact with said screen.

20. In combination, a screen for screening sewage, said screen having a plurality of parallel grooves on one face thereof, a transfer and comminuting unit including a rotatably mounted cylinder having a plurality of teeth projecting therefrom, means for reciprocating said unit across one face of said screen in a direction parallel to said grooves, said teeth passing into said grooves to remove solids therefrom as said unit reciprocates across said screen, and a comb positioned adjacent said rotating cylinder at a point spaced from said screen, said comb having a plurality of notches through which said teeth pass as said cylinder rotates, said teeth cooperating with said comb to comminute solids removed from said screen by said teeth and transferred thereby to said comb.

21. In combination, a screen for screening sewage, said screen having a plurality of parallel grooves on one face thereof, a transfer and comminuting unit including a rotatably mounted cylinder comprising a plurality of spaced disks each having a plurality of teeth projecting therefrom, the periphery of said cylinder between said disks having a roughened surface, means for reciprocating said unit across said one face of said screen in a direction parallel to said grooves, said teeth passing into said grooves to remove solids therefrom as said unit reciprocates across said screen, said roughened surfaces collecting fibrous material from the sewage and wrapping it around itself to such thickness that it acts as a brush to wipe clean the surface of the screen with which it comes in contact, and a comb positioned adjacent said rotating cylinder at a point spaced from said screen, said comb having a plurality of notches through which said teeth pass as said cylinder rotates, said teeth cooperating with said comb to comminute solids removed from said screen by said teeth and transferred thereby to said comb, the surface of said comb between said notches being serrated, said serrations serving to shred the excess of said fibrous material wrapped around said abrasive surfaces.

22. In an apparatus for treating sewage which comprises a screen placed across a channel or conduit through which sewage flows, for intercepting solid matter, a transfer and comminuting unit disposed adjacent the upstream surface of the screen, said unit comprising a rotatable cylinder mounted in cooperative relationship with the upstream surface of said screen, said cylinder being capable of removing solid matter from said screen while being rotated, and a comb cooperating with said cylinder in an area spaced upstream from the screen to comminute said solid matter, and means for effecting relative translatory movement between said screen and said unit so that substantially the whole upstream surface of the screen is periodically swept by said unit to remove solids from said screen to the area of said comb.

23. In an apparatus for treating sewage which comprises a vertically disposed screen placed across a channel or conduit through which sewage flows, for intercepting solid matter, a transfer and comminuting unit comprising a rotatably mounted cylinder disposed adjacent the upstream surface of the screen and in engaging relationship therewith, said cylinder removing solid matter from said screen, and a comb cooperating with said cylinder in an area spaced upstream from the screen to comminute said solid matter, and means for effecting relative translatory movement between said screen and said unit so that substantially the whole upstream surface of the screen is periodically swept by said unit.

24. In an apparatus for treating sewage which comprises a screen placed across a channel or conduit through which sewage flows, for intercepting lumps of solid matter, a transfer and comminuting unit comprising a rotatably mounted cylinder disposed in engaging relationship with the upstream surface of the screen and a comb positioned adjacent the periphery of said cylinder remote from said screen, said cylinder removing solid matter from said screen and cooperating with said comb to comminute it in an area spaced upstream from the screen, and means for causing the said unit to reciprocate along said screen so that substantially the whole upstream surface of the screen is periodically swept by said unit.

25. In an apparatus for treating sewage which comprises a screen placed across a channel or conduit through which sewage flows, for intercepting lumps of solid matter, a transfer and comminuting unit disposed adjacent the upstream surface of the screen, said unit removing solid matter from said screen and comminuting it in an area spaced upstream from the screen, and means for causing the said unit to reciprocate along said screen so that substantially the whole upstream surface of the screen is periodically swept by said unit, said unit comprising a rotatable cylinder having a plurality of teeth projecting from its periphery into engagement with said screen and a pair of cutting combs, said teeth being adapted to continuously sweep from the face of the screen intercepted solids and transfer them to the region of the cutting combs, one of said cutting combs being adapted to cooperate with said teeth to comminute said intercepted solids as said unit is moved in one direction, and said other comb being adapted to cooperate with said teeth to comminute said intercepted solids as the said unit is moved in the other direction, and means to move said combs into cooperating relation with said teeth.

26. A sewage comminuting apparatus interposed in a sewage stream in front of a screen placed across a sewage channel or conduit, for intercepting solid matter carried by the sewage stream, said apparatus comprising a transfer and comminuting unit disposed adjacent the upstream surface of the screen, said unit comprising a rotatably mounted cylinder engaging said screen, said cylinder being capable of removing solid matter from said screen, and a comb positioned in an area upstream from the screen, said cylinder and comb cooperating to comminute said solid matter in said upstream area, and means for effecting relative translatory movement between said screen and said unit so that substantially the whole upstream surface of the screen may be periodically swept by said unit.

27. A sewage comminuting apparatus interposed in a sewage stream in front of a screen placed across a sewage channel or conduit, for intercepting solid matter carried by the sewage stream, said apparatus comprising a transfer and comminuting unit disposed adjacent the upstream surface of the screen, said unit being adapted to remove solid matter from said screen and comminute it in an area upstream from the screen, and means for effecting relative translatory movement between said screen and said unit so that substantially the whole upstream surface of the screen may be periodically swept by said unit, said unit comprising a rotatable cylinder having a plurality of teeth projecting from its periphery and a pair of cutting combs, said teeth being adapted to continuously sweep from the face of the screen intercepted solids and transfer them to the region of the cutting combs, one of said cutting combs being adapted to cooperate with said teeth to comminute said transferred solids as said unit is moved in one direction, and said other comb being adapted to cooperate with said teeth to comminute said transferred solids as said unit is moved in the other direction, and means to move said combs into cooperating relation with said teeth.

28. A sewage comminuting apparatus interposed in a sewage stream in front of a screen placed across a sewage channel or conduit, for intercepting solid matter carried by the sewage stream, said apparatus comprising a transfer and comminuting unit disposed adjacent the upstream surface of the screen, said unit being adapted to remove solid matter from said screen and comminute it in an area upstream from the screen, and means for effecting reciprocatory movement of the said unit along said screen so that substantially the whole upstream surface of the screen may be periodically swept by said unit, said unit comprising a rotatable cylinder having a plurality of teeth projecting from its periphery and a pair of cutting combs, said teeth being adapted to continuously sweep from the face of the screen intercepted solids and transfer them to the region of the cutting combs, one of said cutting combs being adapted to cooperate with said teeth to comminute said transferred solids as said unit is moved in one direction, and said other comb being adapted to cooperate with said teeth to comminute said transferred solids as said unit is moved in the other direction, and means to move said combs into cooperating relation with said teeth.

29. In combination with a channel through which sewage containing solids is flowed, an upstanding screen extending across said channel, a transfer and comminuting unit positioned in front of said screen, said unit comprising a rotatable cutting cylinder and a pair of combs, motor controlled means for raising said unit along said screen, and a hydraulic system controlled by a separate motor, said system being operable to rotate said cutting cylinder and oscillate said combs to move them alternately into comminuting relationship with said cutting cylinder, both of said motors being reversible to simultaneously change the direction of travel of said unit, the rotation of said cutting cylinder, and to oscillate said combs.

30. In combination with a channel through which sewage containing solids is flowed, an upstanding screen extending across said channel, a transfer and comminuting unit positioned in front of said screen, said unit comprising a horizontally disposed toothed cylinder rotatable in contact with said screen to remove therefrom solids intercepted by said screen, a pair of combs alternately engageable with said cylinder in an area spaced forwardly of said screen to comminute said solids away from said screen, and means for raising said unit along the face of said screen whereby said toothed cylinder sweeps substantially the entire face of said screen.

31. In combination with a channel through which sewage containing solids is flowed, an upstanding screen extending across said channel, said screen comprising a plurality of horizontally spaced screen bars, a transfer and comminuting unit positioned in front of said screen, said unit comprising a horizontally disposed cutting cylinder having a plurality of disks spaced horizontally to conform to the spacing between said screen bars and each having a plurality of teeth projecting therefrom, a reversible motor operable to rotate said cylinder, whereby said teeth engage said screen to remove therefrom solids intercepted by said screen, a pair of combs spaced adjacent said cutting cylinder but away from said screen, and means to oscillate said combs to position them alternately into comminuting position relative to said cutting cylinder, said last mentioned means being synchronized with said reversible motor to oscillate said combs once at every reversal of said motor.

32. The method of comminuting sewage solids carried by a sewage stream which comprises intercepting solids carried by the stream on a screen, removing the solids from the screen, comminuting the removed solids in the stream and upstream and off of the face of the screen, and flowing the comminuted solids through the screen along with the oncoming sewage stream.

33. The method of comminuting solids carried by a sewage stream which comprises intercepting such solids on a screen, removing the solids from the screen and transferring them to a comminuting zone located upstream of and spaced from the face of the screen, comminuting the removed solids in said comminuting zone while they are in the stream and are spaced out of physical contact with the screen, and flowing the comminuted solids through the screen along with the oncoming sewage.

34. The method of comminuting sewage solids carried by a sewage stream which comprises intercepting solids carried by the stream on a screen, removing the solids from the screen and transferring them to a comminuting zone located upstream and off of the face of the screen, comminuting the removed solids in the stream and upstream and off of the face of the screen, and flowing the comminuted solids through the screen along with the oncoming sewage stream.

35. In combination with a screen for straining sewage, a transfer and comminuting unit comprising a rotatably mounted shaft, a plurality of disks mounted on said shaft, each of said disks having a plurality of teeth projecting from its periphery, a plurality of tubular spacers interposed between said disks, an abrasive surface on the peripheral surface of each of said spacers, said rotatably mounted shaft being positioned adjacent said screen whereby said teeth and abrasive surfaces remove solids from the front of said screen as said shaft is rotated, and a comb positioned in the path of rotation of said teeth, said comb cooperating with said teeth and said abrasive surfaces to comminute solids removed from said screen.

36. In combination with a screen for straining sewage, a transfer and comminuting unit slidably mounted to move back and forth across the face of said screen, said unit comprising a rotatably mounted shaft, a plurality of disks mounted on said shaft, each of said disks having a plurality of teeth projecting from its periphery, a plurality of tubular spacers interposed between said disks, an abrasive surface on the peripheral surface of each of said spacers, said rotatably mounted shaft being positioned adjacent said screen whereby said teeth and abrasive surfaces remove solids from the front of said screen as said shaft is rotated, a shaft parallel to said rotatably mounted shaft, means to oscillate said second shaft once at each reversal of direction of the sliding movement of said unit, and a pair of combs mounted on said second shaft, each oscillation of said shaft moving one of said combs into position to cooperate with said teeth and abrasive surfaces to comminute solids removed from said screen and simultaneously moving said other comb from cooperating position.

37. In combination, a screen for screening sewage, said screen having a plurality of parallel grooves on one face thereof, a comminuting device including a rotatably mounted cylinder comprising a plurality of spaced disks each having a plurality of teeth projecting therefrom, the periphery of said cylinder between said disk having an abrasive surface, means for reciprocating said cylinder across said one face of said screen in tangential relation therewith, said teeth passing into said grooves to remove solids therefrom as said comminuting device reciprocates across said screen, said abrasive surfaces passing close enough to the portion of said screen adjacent said grooves to remove therefrom fibrous material not removed by said teeth, and a comb positioned adjacent said rotatably mounted cylinder at a point spaced from said screen, said comb having a plurality of notches through which said teeth pass as said cylinder rotates, said teeth cooperating with said comb to comminute solids removed from said screen by said teeth and transferred thereby to said comb, the surface of said comb between said notches being serrated, and the abrasive surfaces of said rotatably mounted cylinder cooperating with said serrations to shred said fibrous material.

38. In an apparatus for treating sewage which comprises a screen adapted to be placed across a channel or conduit through which sewage flows, for intercepting lumps of solid matter, a transfer and comminuting unit disposed adjacent the upstream surface of the screen, said unit being adapted to remove solid matter from said screen and comminute it in an area spaced upstream from the screen, and means for reciprocating the said unit along said screen so that substantially the whole upstream surface of the screen is periodically swept by said unit, said unit comprising a rotatable cylinder having its axis disposed in a plane parallel to the plane of said screen, said cylinder being mounted for translation of its axis with its periphery tangentially related to the screen, said cylinder having a plurality of teeth projecting from its periphery, a shaft mounted in parallel relationship to said cylinder and spaced upstream therefrom, and a pair of cutting combs rigidly secured to said shaft, each of said combs having a cutting edge spaced slightly from the portion of the periphery of said cylinder most remote from said screen, said teeth being adapted to continuously sweep from the face of the screen intercepted solids and transfer them to the region of the cutting combs, one of said cutting combs being adapted to cooperate with said teeth as said comminuting unit is moved in one direction, and said other comb being adapted to cooperate with said teeth as the said comminuting unit is moved in the other direction, and means to oscillate the shaft to thereby selectively move each of said combs alternately into cooperating relation with said teeth in accordance with the direction of the reciprocatory movement of said unit.

39. In combination with a screen for straining sewage, a frame supporting said screen, a comminuting unit slidable mounted adjacent said screen, means for moving said comminuting unit back and forth across the face of said screen, said comminuting unit comprising a rotatably mounted cylinder substantially parallel to the face of the screen having teeth projecting from its periphery, said unit also comprising a shaft mounted for oscillation once at each reversal of direction of sliding movement of said comminuting unit, and a pair of cutting combs alternately movable into operative position by said shaft as said shaft oscillates, said teeth passing between recesses in the comb in operative position as said cylinder rotates to comminute sewage solids removed from said screen by said teeth and transferred thereby to said comb.

40. In combination with a screen for straining sewage, a frame supporting said screen, a comminuting unit slidably mounted adjacent said screen, means for moving said comminuting unit back and forth across the face of said screen, said comminuting unit comprising a rotatably mounted cylinder substantially parallel to the face of the screen having teeth projecting from its periphery, said unit also comprising a shaft mounted for oscillation once at each reversal of direction of sliding movement of said comminuting unit, and a pair of cutting combs secured to said shaft and alternately movable into operative position by said shaft as said shaft oscillates, said teeth passing between recesses in the comb in operative position as said cylinder rotates to comminute sewage solids removed from said screen by said teeth and transferred thereby to said comb.

41. In combination with a screen for straining sewage, a frame supporting said screen, a comminuting unit slidably mounted adjacent said screen, means for moving said comminuting unit back and forth across the face of said screen, said comminuting unit comprising a rotatably mounted cylinder positioned substantially parallel to the face of the screen and in proximity thereto, said cylinder having teeth projecting from its periphery, said unit also comprising a shaft mounted for oscillation once at each reversal of direction of sliding movement of said comminuting unit, said shaft being parallel to said cylinder and a pair of cutting combs rigidly secured to said shaft and alternately movable into operative position by said shaft as said shaft oscillates, said teeth passing between recesses in the comb in operative position as said cylinder rotates to comminute sewage solids removed from said screen by said teeth and transferred thereby to said comb.

42. In combination with a screen for straining sewage, a frame supporting said screen, a comminuting unit slidably mounted adjacent said screen, means for moving said comminuting unit back and forth across the face of said screen, said comminuting unit comprising a rotatably mounted cylinder substantially parallel to the face of the screen having teeth projecting from its periphery, said unit also comprising a shaft mounted for oscillation once at each reversal of direction of sliding movement of said comminuting unit, and a pair of cutting combs alternately movable into operative position by said shaft as said shaft oscillates, said teeth cooperating with the comb in operative position to comminute sewage solids.

43. In combination with a screen for straining sewage, a frame supporting said screen, a comminuting unit slidably mounted adjacent said screen, means for moving said comminuting unit back and forth across the face of said screen, said comminuting unit comprising a rotatably mounted cylinder substantially parallel to the face of the screen having teeth projecting from its periphery, said unit also comprising a shaft mounted for oscillation once at each reversal of direction of sliding movement of said comminuting unit, and a cutting comb movable into operative position by said shaft as said shaft oscillates, said teeth passing between recesses in said comb when the comb is in operative position to comminute sewage solids as said cylinder rotates.

44. In combination, a screen for screening sewage, a frame supporting said screen, and a transfer and comminuting unit mounted on said frame to reciprocate in front of said screen, said unit comprising a rotatably mounted cylinder having its axis disposed in a plane parallel to the plane of said screen, said cylinder being mounted for translation of its axis with its periphery tangentially related to the screen, a plurality of teeth projecting laterally from the periphery of said cylinder, said teeth cooperating with said screen to remove sewage solids therefrom as said cylinder is rotated, and a comb spaced from said screen a distance greater than the radius of said cylinder, said comb cooperating with said teeth to comminute sewage solids removed from said screen by said teeth.

45. In combination, a screen for screening sewage, a frame supporting said screen, said screen having a plurality of parallel grooves on one face thereof, and a transfer and comminuting unit mounted on said frame to reciprocate in front of said screen, said unit comprising a rotatably mounted cylinder having its axis disposed in a plane parallel to the plane of said screen and being mounted for translation of its axis with its periphery tangentially related to the screen, said cylinder having a plurality of teeth projecting laterally therefrom into said grooves, said teeth cooperating with said screen to remove sewage solids therefrom as said cylinder is rotated, and a comb spaced from said screen a distance greater than the radius of said cylinder, said comb cooperating with said teeth to comminute sewage solids removed from said screen by said teeth.

46. In an apparatus for treating sewage which comprises a screen adapted to be placed across a channel or conduit through which sewage flows, for intercepting lumps of solid matter, a transfer and comminuting unit disposed adjacent the upstream surface of the screen, said unit comprising a cutting comb positioned in a plane substantially parallel to the plane of said screen and a rotatably mounted cutting cylinder positioned adjacent said screen and substantially parallel to the plane thereof, said cutting cylinder being positioned intermediate said screen and said cutting comb with its periphery tangentially related to said screen, said unit removing solid matter from said screen and comminuting it in a zone spaced upstream from the screen, and means for reciprocating said unit along said screen so that substantially the whole upstream surface of the screen is periodically swept by said unit.

47. In an apparatus for treating sewage which comprises a screen adapted to be placed across a channel or conduit through which sewage flows, for intercepting lumps of solid matter, a transfer and comminuting unit disposed adjacent the upstream surface of the screen, said unit comprising a shaft positioned substantially parallel to the plane of said screen, a cutting comb mounted on said shaft, and a cutting cylinder rotatably mounted in a position adjacent said screen and substantially parallel to the plane thereof, said cutting cylinder being positioned intermediate said screen and said shaft, said unit removing solid matter from said screen and comminuting it in a zone spaced upstream from the screen, and means for reciprocating said unit along said screen with the periphery of said cutting cylinder maintained in tangential relationship to said screen so that substantially the whole upstream surface of the screen is periodically swept by said unit.

48. In an apparatus for treating sewage which comprises a screen adapted to be placed across a channel or conduit through which sewage flows, for intercepting lumps of solid matter, a transfer and comminuting unit disposed adjacent the upstream surface of the screen, said unit comprising a shaft positioned substantially parallel to the plane of said screen, a cutting comb secured to said shaft, and a cutting cylinder rotatably mounted in a position adjacent said screen and substantially parallel to the plane thereof, said cutting cylinder being positioned intermediate said screen and said shaft with its periphery in tangential relationship to said screen, said cutting cylinder during rotation removing solid matter from said screen and comminuting it in co-operation with said cutting comb in a zone spaced upstream from the screen, and means for reciprocating said unit along said screen so that substantially the whole upstream surface of the screen is periodically swept by said unit.

49. In an apparatus for treating sewage which comprises a screen adapted to be placed across a channel or conduit through which sewage flows, for intercepting lumps of solid matter, a transfer and comminuting unit disposed adjacent the upstream surface of the screen, said unit comprising a shaft positioned substantially parallel to the plane of said screen, a pair of cutting combs secured to said shaft, and a cutting cylinder rotatably mounted in a position adjacent said screen and substantially parallel to the plane thereof, said cutting cylinder being positioned intermediate said screen and said shaft, said cutting cylinder having projecting cutting teeth for removing solid matter from said screen and comminuting it in cooperation with said cutting comb in a zone spaced upstream from the screen, and means for reciprocating said unit along said screen so that substantially the whole upstream surface of the screen is periodically swept by said unit, said shaft being mounted for oscillation once at each reversal of direction of movement of said unit along said screen to bring one of said combs into operative relationship with said cutting teeth.

CARL H. NORDELL.

References Cited in the file of this patent

UNITED STATES PATENTS

| Number | Name | Date |
| --- | --- | --- |
| 1,794,504 | Van Norman | Mar. 3, 1931 |
| 1,874,125 | Schofield et al. | Aug. 30, 1932 |
| 1,982,266 | Nordell | Nov. 27, 1934 |
| 2,106,851 | Nordell | Feb. 1, 1938 |
| 2,305,935 | Thom | Dec. 22, 1942 |
| 2,317,416 | Stanley | Apr. 27, 1943 |
| 2,358,655 | Nordell | Sept. 19, 1944 |
| 2,378,757 | Durdin | June 19, 1945 |
| 2,389,306 | Green | Nov. 20, 1945 |
| 2,391,704 | Hughes | Dec. 25, 1945 |